United States Patent [19]

Ishiguro et al.

[11] Patent Number: 4,972,482
[45] Date of Patent: Nov. 20, 1990

[54] FM STEREO DEMODULATOR

[75] Inventors: Kazuhisa Ishiguro; Mikio Yamagishi, both of Gunma, Japan

[73] Assignee: Sanyo Electric Co., Ltd., Osaka, Japan

[21] Appl. No.: 244,074

[22] Filed: Sep. 13, 1988

[30] Foreign Application Priority Data

Sep. 18, 1987 [JP] Japan ................................. 62-235442
Dec. 25, 1987 [JP] Japan ................................. 62-331178

[51] Int. Cl.$^5$ ............................................. H04H 5/00
[52] U.S. Cl. ........................................... 381/10; 381/1
[58] Field of Search ..................... 381/1, 4, 10, 2, 3

[56] References Cited

U.S. PATENT DOCUMENTS 4,249,038  2/1981  Stienstra ................................. 381/4
4,748,669  5/1988  Klayman ................................. 381/1

Primary Examiner—Forester W. Isen
Attorney, Agent, or Firm—Darby and Darby

[57] ABSTRACT

Levels of a stereo sum signal and a stereo difference signal are detected by first and second level detectors (7, 9), respectively. Outputs of the first and second level detectors (7, 9) are compared with each other by a comparator (10). A voltage controlled amplifier (4) is responsive to an output of the comparator (10) for changing a level of the stereo difference signal, when a broadcasting signal including only either one of a left stereo signal and a right stereo signal is received, such that the levels of the stereo sums signal and the stereo difference signal are equal to each other.

19 Claims, 4 Drawing Sheets

FM STEREO DEMODULATOR

BACKGROUND OF THE INVENTION

1. Field of the Invention

The present invention relates generally to stereo demodulators for FM stereo broadcasting, and more particularly, to a stereo demodulator which can always keep separation between right and left stereo signals the maximum.

2. Description of the Prior Art

In a matrix circuit in an FM stereo receiver in which right and left stereo signals are obtained by adding a stereo sum signal to a stereo difference signal, levels of the stereo sum signal and the stereo difference signal are adjusted so that good separation is obtained. The adjustment of the levels is made by, for example, the following method. A stereo composite signal including only a left stereo signal and not a right stereo signal is applied to a stereo demodulator, and the level of the stereo sum signal or the stereo difference signal to be applied to the matrix circuit is adjusted by a voltage divider circuit or the like such that an output level of an output terminal for the right stereo signal (right output terminal) of the matrix circuit in the stereo demodulator becomes zero. Thus, leakage from the left stereo signal to the right stereo signal can be made zero. In addition, leakage from the right stereo signal to the left stereo signal must be made zero. Therefore, a stereo composite signal including only the right stereo signal and not the left stereo signal is applied to the stereo demodulator, and the level of the stereo sum signal or the stereo difference signal is adjusted such that an output level of an output terminal for the left stereo signal (left output terminal) of the matrix circuit becomes zero. Thus, right and left stereo signals having good separation can be obtained.

Figure 1:
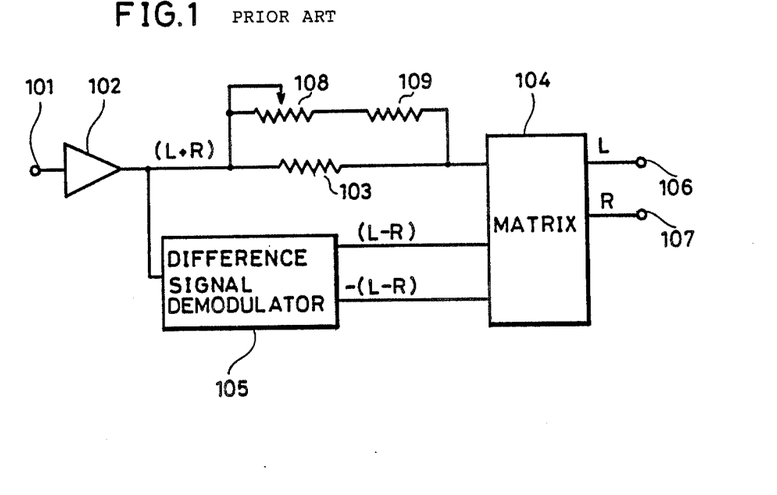
FIG. 1 is a diagram showing a structure of a conventional FM stereo demodulator comprising a stereo separation adjusting circuit.

FIG. 1 shows a conventional stereo demodulator in which separation is adjusted by adjusting levels of a stereo sum signal and a stereo difference signal applied to a matrix circuit. This stereo demodulator is described in, for example, Japanese Patent Publication No. 15580/1984.

In FIG. 1, a stereo composite signal as FM (frequency-modulation)-detected is applied to an input terminal 101. A stereo sum signal (L+R) in the stereo composite signal is applied to a matrix circuit 104 through a buffer amplifier 102 and an adjusting resistor 103. In addition, a stereo difference signal (L−R) in the stereo composite signal is demodulated by a difference signal demodulator 105, so that stereo difference signals (L−R) and -(L−R) whose phases are reverse to each other are applied to the matrix circuit 104. In the matrix circuit 104, the stereo sum signal L+R) and the stereo difference signal (L−R) are added so that a left stereo signal L is generated at a left output terminal 106, while the stereo sum signal (L+R) and the stereo difference signal -(L−R) are added so that a right stereo signal R is generated at a right output terminal 107. On the other hand, a series circuit of a variable resistor 108 and a resistor 109 is connected in parallel with the adjusting resistor 103. Separation can be adjusted by adjusting a value of the variable resistor 108.

However, in the above described method for adjusting separation, the resistance value of the variable resistor 108 must be manually adjusted while observing waveforms of output signals which appear at the left and right output terminals 106 and 107 of the matrix circuit 104, resulting in the inaccuracy of adjustment and the increase in the number of manufacturing processes. In addition, when the stereo demodulator is formed as an integrated circuit, the variable resistor 108 must be externally provided on an IC (integrated circuit), resulting in the increase in the number of parts externally provided and the increase in the number of pins externally provided, which is not preferable. Furthermore, when the initialization value of the variable resistor 108 deviates, separation is decreased. Additionally, the resistance value of the variable resistor 108 deviates due to the change in environment such as the change in temperature, the change with time and the change with age, so that the separation is deteriorated again.

SUMMARY OF THE INVENTION

An object of the present invention is to provide a stereo demodulator which can always keep separation the maximum.

Another object of the present invention is to provide a stereo demodulator in which separation is automatically adjusted.

Still another object of the present invention is to provide a stereo demodulator in which the inaccuracy of adjustment of separation and the increase in the number of manufacturing processes can be avoided.

Yet still another object of the present invention is to provide a stereo demodulator in which the number of parts externally provided and the number of pins externally provided are not increased when formed as an integrated circuit.

A further object of the present invention is to provide a stereo demodulator in which separation is not deteriorated due to the change in environment such as the change in temperature, the change with time and the change with age.

In order to attain the above described objects, the FM stereo demodulator according to the present invention comprises stereo difference signal demodulating means, matrix means, first level detecting means, second level detecting means, first comparing means and first level adjusting means. The stereo difference signal demodulating means demodulates a stereo difference signal in a stereo composite signal. The matrix means generates a left stereo signal and a right stereo signal from a stereo sum signal in the stereo composite signal and the stereo difference signal. The first level detecting means detects a level of the stereo sum signal in the stereo composite signal. The second level detecting means detects a level of the stereo difference signal. The first comparing means compares an output of the first level detecting means with an output of the second level detecting means. The first level adjusting means is responsive to an output of the first comparing means for changing the level of at least one of the stereo sum signal and the stereo difference signal applied to the matrix means, when only either one of the left stereo signal and the right stereo signal is included in the stereo composite signal, such that the outputs of the first level detecting means and the second level detecting means are equal to each other.

In the above described FM stereo demodulator, the levels of the stereo sum signal and the stereo difference signal immediately before application to the matrix means are compared with each other. As a result, when only either one of the left stereo signal and the right stereo signal is included in the stereo composite signal, the first level adjusting means is operated such that the levels of the stereo sum signal and the stereo difference signal coincide with each other, so that separation can be automatically adjusted.

Thus, every time FM broadcasting including only the left stereo signal or the right stereo signal is received, the levels of the stereo sum signal and the stereo difference signal can be automatically adjusted. As a result, the adjustment work of separation is not completely required. In addition, the best separation is always obtained without deviating due to the change in environment, the change with time or the like.

An FM stereo demodulator according to another aspect of the present invention further comprises third level detecting means and switching means. The third level detecting means detects a level of the output of the first comparing means. The switching means applies the output of the first comparing means to the first level adjusting means when an output of the third level detecting means is smaller than a predetermined value while applying a predetermined voltage to the first level adjusting means when the output of the third level detecting means is larger than the predetermined value.

Therefore, even when an ordinary stereo composite signal including a left stereo signal and a right stereo signal at a predetermined level or more is received, a malfunction at the time of ordinary reception caused by automatic adjustment can be prevented.

An FM stereo demodulator according to still another aspect of the present invention comprises stereo difference signal demodulating means, matrix means, level adjusting means, separation adjusting means, storing means and control signal supplying means. The stereo difference signal demodulating means demodulates a stereo difference signal in a stereo composite signal. The matrix means generates a left stereo signal and the right stereo signal from a stereo sum signal and the stereo difference signal in the stereo composite signal. The level adjusting means changes a level of at least one of the stereo sum signal and the stereo difference signal applied to the matrix means. The separation adjusting means applies a control signal to the level adjusting means, at the time of adjustment of separation, such that separation between the left stereo signal and the right stereo signal generated by the matrix means becomes the maximum. The storing means stores the control signal from the separation adjusting means. The control signal supplying means applies the control signal stored in the storing means to the level adjusting means at the time of reception of stereo broadcasting.

In the above described FM stereo demodulator, since the level adjusting means is driven in response to the control signal from the separation adjusting means, the levels of the stereo sum signal and the stereo difference signal can exactly coincide with each other, so that the maximum stereo separation can be ensured. In addition, since the control signal obtained from the separation adjusting means when the maximum stereo separation is obtained is stored in the storing means and the level adjusting means is driven in response to the control signal obtained from the storing means at the time of reception of stereo broadcasting, the stereo demodulator can be always kept in a state in which the maximum separation is always obtained.

Thus, according to the present invention, the stereo demodulator can be obtained which can always keep stereo separation in the best state. In addition, the stereo demodulator can be obtained in which separation is not deteriorated due to the change in environment, the change with age or the like.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Referring now to the drawings, embodiments of the present invention will be described in detail.

Figure 2:
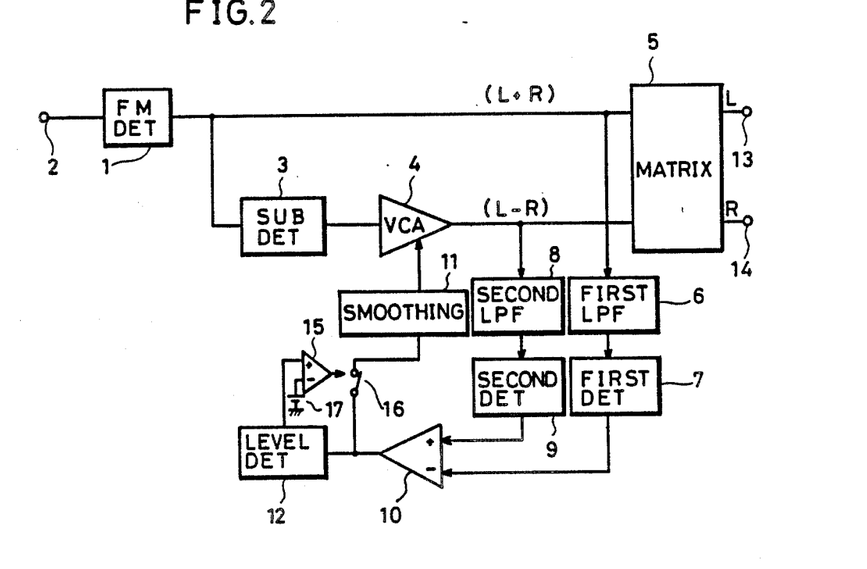
FIG. 2 is a block diagram showing a structure of an FM stereo demodulator according to one embodiment of the present invention.

FIG. 2 is a block diagram showing a structure of an FM stereo demodulator according to one embodiment of the present invention. In the FM stereo demodulator according to the present embodiment, separation is adjusted only when only either one of a left stereo signal and a right stereo signal is included in a stereo composite signal at the time of ordinary reception of FM broadcasting; otherwise separation would not adjusted. At the time of ordinary reception of FM broadcasting in which a broadcasting signal includes both the left stereo signal and the right stereo signal, levels of a stereo sum signal (L+R) and a stereo difference signal (L−R) differ from each other. Thus, if control is performed such that the levels are the same, separation is rather deteriorated.

In FIG. 2, an FM detector circuit 1 FM-detects a frequency-modulated stereo composite signal applied to an input terminal 2. A subchannel demodulator (stereo difference signal demodulator) 3 detects a subchannel signal in the stereo composite signal from the FM detector circuit 1 and demodulates a stereo difference signal (L−R). A voltage controlled amplifier (variable gain amplifier) 4 amplifies the stereo difference signal (L−R) obtained from the subchannel demodulator 3. A matrix circuit 5 generates a left stereo signal L and a right stereo signal R from a stereo sum signal (L+R) included in the stereo composite signal from the FM detector circuit 1 and the stereo difference signal (L−R) from the voltage controlled amplifier 4, to output the signals to a left output terminal 13 and a right output terminal 14, respectively.

A first low-pass filter 6 eliminates a high frequency component in the stereo sum signal (L+R). A first level detector 7 detects a direct current (dc) voltage corresponding to an output signal of the first low-pass filter 6.

A second low-pass filter 8 eliminates a high frequency component in the stereo difference signal (L−R). A second level detector 9 detects a dc voltage corresponding to an output signal of the second low-pass filter 8. An output terminal of a comparator 10 is connected to a smoothing circuit 11 through a switching element 16 and to a level detector 12. The switching element 16 is structured by, for example, transistors. The smoothing circuit 11 smoothes an output signal of the comparator 10 to convert the signal to a dc voltage, to apply the same to the voltage controlled amplifier 4 as a gain control signal. The level detector 12 detects the dc voltage corresponding to the output signal of the comparator 10. A comparator 15 compares an output signal of the level detector 12 with a voltage generated from a voltage source 17, to open the switching element 16 when the output signal of the level detector 12 becomes a voltage of the voltage source 17 or more. The gain of the voltage controlled amplifier 4 is controlled in response to the gain control signal applied from the smoothing circuit 11.

Figure 3:
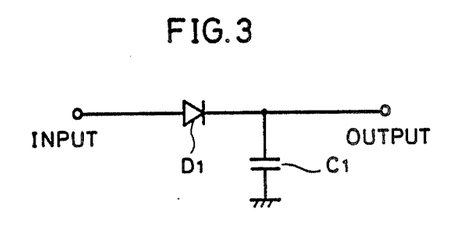
FIG. 3 is a circuit diagram showing a specific example of first and second level detectors shown in FIG. 2.

FIG. 3 shows a specific embodiment of each of the first level detector 7, the second level detector 9 and the level detector 12. The level detector shown in FIG. 3 is a diode detector, which comprises a diode D1 and a capacitor Cl. The first level detector 7, the second level detector 9 and the level detector 12 may have another structures in which a level of an alternating current signal can be detected. For example, they may be a full-wave rectifier.

Figure 4:
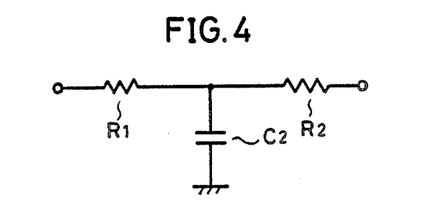
FIG. 4 is a circuit diagram showing a specific example of a smoothing circuit shown in FIG. 2.

FIG. 4 shows a specific example of the smoothing circuit 11. As shown in FIG. 4, the smoothing circuit comprises resistors R1 and R2 and a capacitor C2. The resistance value of the resistor R1 is small while the resistance value of the resistor R2 is large. Consequently, the charging time constant becomes small while the discharging time constant becomes large. Therefore, even if the charging time is short, an output voltage can be held for a long time.

Description is now made on an operation of the FM stereo demodulator shown in FIG. 2.

A frequency-modulated stereo composite signal applied to the input terminal 2 is FM-detected in the FM detector circuit 1, to be applied to the matrix circuit 5 and the subchannel demodulator 3. In the subchannel demodulator 3, a subchannel signal in the stereo composite signal is demodulated, so that a stereo difference signal (L−R) is obtained. The stereo difference signal (L−R) is applied to the matrix circuit 5 through the voltage controlled amplifier 4. In the matrix circuit 5, a stereo sum signal (L+R) in the stereo composite signal is added to a stereo difference signal (L−R) of positive polarity so that a left stereo signal L is obtained, to be outputted from the left output terminal 13, which the stereo sum signal (L+R) is added to a stereo difference signal -(L−R) of negative polarity so that a right stereo signal R is obtained, to be outputted from the right output terminal 14.

A high-frequency component of the stereo sum signal (L+R) in the stereo composite signal outputted from the FM detector circuit 1 is eliminated in the first low-pass filter 6 and then, a level thereof is detected in the first level detector 7. Consequently, a dc voltage corresponding to a level of the stereo sum signal (L+R) is applied to a negative input terminal of the comparator 10. In addition, a high-frequency component of the stereo difference signal (L−R) outputted from the voltage controlled amplifier 4 is eliminated in the second low-pass filter 8 and then, a level thereof is detected in the second level detector 9. Consequently, a dc voltage corresponding to a level of the stereo difference signal (L−R) is applied to a positive input terminal of the comparator 10. As a result, the comparator 10 compares the level of the stereo sum signal (L+R) with the level of the stereo difference signal (L−R).

Description is now made on a case in which only either one of the right stereo signal R and the left stereo signal L is included in an FM stereo signal as being received. In this case, an output signal of a level lower or higher, by a voltage corresponding to the level difference between the stereo sum signal (L+R) and the stereo difference signal (L−R), than a bias voltage of the comparator 10 is generated from the output terminal of the comparator 10. The output signal of the comparator 10 is smoothed by the smoothing circuit 11 and then, applied to the voltage controlled amplifier 4 as a gain control signal. When the level of the stereo difference signal (L−R) is higher than that of the stereo sum signal (L+R), the gain of the voltage controlled amplifier 4 is controlled such that the level of the stereo difference signal (L−R) is lowered. Contrary to this, when the level of the stereo difference signal (L−R) is lower than that of the stereo sum signal (L+R), the gain of the voltage controlled amplifier 4 is controlled such that the level of the stereo difference signal (L−R) is raised. Consequently, the stereo sum signal (L+R) and the stereo difference signal (L−R) whose respective levels are automatically adjusted are applied to the matrix circuit 5. As a result, the left stereo signal L and the right stereo signal R correctly separated from each other are outputted from the left output terminal 13 and the right output terminal 14 of the matrix circuit 5, respectively.

If and when only either one of the left stereo signal L and the right stereo signal R is included in the FM stereo signal, the level difference between the stereo sum signal (L+R) and the stereo difference signal (L−R) is small. Therefore, the level of the output signal of the comparator 10 is lower than a voltage level of the voltage source 17. Thus, the switching element 16 is kept in a closed state. More specifically, the gain of the voltage controlled amplifier 4 is controlled in response to the gain control signal applied from the comparator 10 through the smoothing circuit 11.

Description is now made on a case in which both the left stereo signal L and the right stereo signal R are included in the FM broadcasting signal as received.

It is assumed that the left stereo signal L and the right stereo signal R have the same level and reverse in phase to each other. In this case, since the level of the stereo sum signal (L+R) becomes zero, a level of the signal applied to the negative input terminal of the comparator 10 also becomes zero. Consequently, the level difference between the signals respectively applied to the positive input terminal and the negative input terminal of the comparator 10 becomes large, so that a gain control signal at a higher level than the voltage level of the voltage source 17 is outputted from the output terminal of the comparator 10. In this case, a control signal is applied to the switching element 16 from the output terminal of the comparator 15. The switching element 16 enters an opened state in response to the control signal. As a result, the gain control signal outputted from the comparator 10 is not applied to the voltage controlled amplifier 4. In this case, a voltage held in the capacitor C2 in the smoothing circuit 11 before the switching element 16 is opened continues to be applied to the voltage controlled amplifier 4 as a gain control signal.

More specifically, the levels of the stereo sum signal (L+R) and the stereo difference signal (L−R) are kept in the optimum state adjusted when only either one of the right stereo signal R and the left stereo signal L are received.

It is assumed that the right stereo signal R and the left stereo signal L have the same level and are in phase with each other. In this case, since the level of the stereo difference signal (L-R) becomes zero, the level of the signal applied to the positive input terminal of the comparator 10 becomes zero. Consequently, the level difference between the signals respectively applied to the negative input terminal and the positive input terminal of the comparator 10 becomes large, so that a gain control signal at a lower level than the bias voltage of the comparator 10 is outputted from the output terminal of the comparator 10. Therefore, the low level gain control signal is applied to the voltage controlled amplifier 4 through the smoothing circuit 11, so that the gain of the voltage controlled amplifier 4 is increased. However, since the level of the stereo difference signal is zero, a voltage is not applied to the input terminal of the voltage controlled amplifier 4. Consequently, even if the gain of the voltage controlled amplifier 4 is increased, the stereo difference signal (L−R) is not outputted from the output terminal thereof.

Meanwhile, since noises slightly occur from the subchannel demodulator 3, the gain of the voltage controlled amplifier 4 must be limited such that there is no effect of the noises. More specifically, it is necessary that an amplifier having too large gain is not employed as the voltage controlled amplifier 4.

Figure 5:
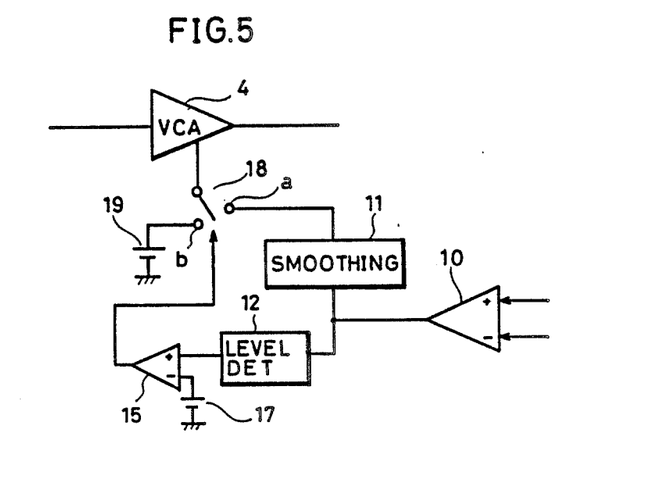
FIG. 5 is a diagram showing another example of a circuit portion for applying to a voltage controlled amplifier a control signal outputted from a comparator.

FIG. 5 shows another example of the circuit portion for applying the gain control signal to the voltage controlled amplifier 4.

In the circuit shown in FIG. 5, a switching element 18 and a voltage source 19 are provided instead of the switching element 16 shown in FIG. 2. When the level difference between the stereo sum signal (L+R) and the stereo difference signal (L−R) is small, that is, when only either one of the left stereo signal L and the right stereo signal R are included in the stereo composite signal, the switching element 18 is switched to the side of a contact a; otherwise it is switched to the side of a contact b. When the switching element 18 is switched to the side of the contact b, a constant voltage is applied to the voltage controlled amplifier 4 from the voltage source 19 as a gain control signal. Therefore, the gain of the voltage controlled amplifier 4 is set constant.

Although in the embodiment shown in FIG. 2, the voltage controlled amplifier 4 is provided in a signal path of the stereo difference signal (L−R), the voltage controlled amplifier 4 may be provided in a signal path of the stereo sum signal (L+R) so that the level of the stereo sum signal (L+R) is adjusted. In addition, the voltage controlled amplifier 4 may be provided in the preceding stage of the subchannel demodulator 3.

Figure 6:
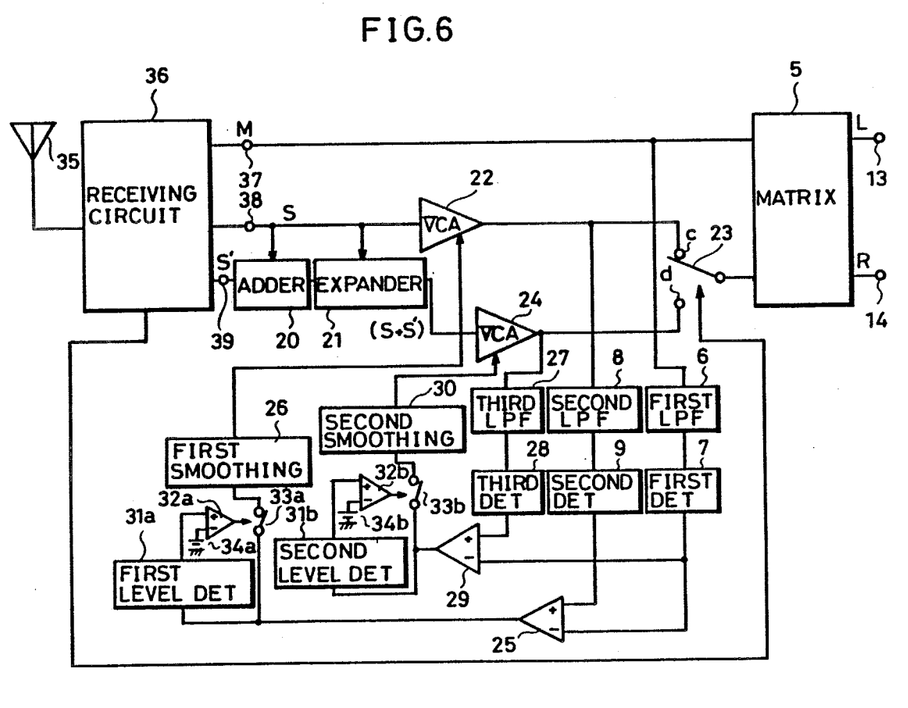
FIG. 6 is a block diagram showing a structure of an FM stereo demodulator according to another embodiment of the present invention.

FIG. 6 is a block diagram showing a structure of an FMX stereophonic broadcasting receiver to which the present invention is applied.

In FIG. 6, the same circuit elements as those shown in FIG. 1 have the same reference numerals and hence, the description thereof is omitted.

FMX stereophonic broadcasting has been proposed as one means for enlarging the service area and improving signal-to-noise ratio characteristics of FM stereo broadcasting. A transmission signal of the FMX broadcasting includes a stereo difference signal (L−R)′ as level-compressed and phase-shifted, by 90°, from a stereo difference signal (L−R), which is broadcast simultaneously with a transmission signal of the conventional FM stereo broadcasting, for example, a stereo sum signal (L+R) and a stereo difference signal (L−R). Therefore, in the stereo broadcasting receiver, the compressed stereo difference signal (L−R)′ must be expanded.

In FIG. 6, when a broadcasting signal of FMX stereophonic broadcasting is received by a receiving circuit 36 through an antenna 35, a stereo sum signal M, a stereo difference signal S and a compressed stereo difference signal S′ are demodulated, to be outputted from terminals 37, 38 and 39, respectively. The compressed stereo difference signal S′ outputted from the receiving circuit 36 is added to the stereo difference signal S outputted from the receiving circuit 36 in an adder 20. A level of a signal (S+S′) obtained by addition is expanded in an expander 21 such that the level is equal to a level of the stereo difference signal S. The stereo sum signal M outputted from the receiving circuit 36 is directly applied to a matrix circuit 5. The stereo difference signal S is applied to the matrix circuit 5 through a first voltage controlled amplifier 22 and a switch 23. The output signal (S+S′) of the expander 21 is applied to the matrix circuit 5 through the second voltage controlled amplifier 24 and the switch 23.

The receiving circuit 36 contains a determining circuit for determining whether or not a reception signal is a broadcasting signal of the FMX stereophonic broadcasting. When the FMX stereophonic broadcasting is not being received, the switch 23 is switched to the side of a contact c in response to a control signal outputted from the receiving circuit 36, as shown in FIG. 6. This state is the same as the state in which the FM stereo demodulator shown in FIG. 2 receives the FM stereo broadcasting. In this state, when an FM stereo broadcasting signal including only either one of a right stereo signal R and a left stereo signal L is received, an output signal corresponding to the level difference between the stereo sum signal M and the stereo difference signal S is generated at an output terminal of a first comparator 25. The output signal of the first comparator 25 is smoothed in a first smoothing circuit 26 and then, applied to the first voltage controlled amplifier 22 as a gain control signal. Consequently, the gain of the first voltage controlled amplifier 22 is controlled such that the level of the stereo difference signal S outputted from the first voltage controlled amplifier 22 is equal to the level of the stereo sum signal M.

On the other hand, when the FMX stereophonic broadcasting is being received, the switch 23 is switched to the side of a contact d in response to the control signal outputted from the receiving circuit 36. In this case, the output signal (S+S′) of the expander 21 is applied to the matrix circuit 5 through the second voltage controlled amplifier 24 and the switch 23. In this state, a high frequency component of an output signal of the second voltage controlled amplifier 24 is removed in a third low-pass filter 27 and then, the output signal is level-detected in a third level detector 28, to be converted to a dc voltage. The dc voltage outputted from the third level detector 28 is compared with a dc voltage outputted from a first level detector 7 in a second comparator 29, so that an output voltage corresponding to the level difference therebetween is outputted from the second comparator 29. The output signal of the second comparator 29 is smoothed by a second smoothing circuit 30 and then, applied to the second voltage controlled amplifier 24 as a gain control signal. Consequently, the gain of the second voltage controlled amplifier 24 is controlled such that a level of the output signal (S+S') of the second voltage controlled amplifier 24 is equal to the level of the stereo sum signal M.

In the above described manner, the stereo sum signal M and the output signal (S+S') of the second voltage controlled amplifier 24 whose levels are automatically adjusted are applied to the matrix circuit 5. Thus, the signals are added in the matrix circuit 5, so that the left stereo signal L and the right stereo signal R correctively separated from each other are outputted to a left output terminal 13 and a right output terminal 14, respectively.

Meanwhile, operations of a circuit comprising a first level detector 31a, a comparator 32a, a switching element 33a and a voltage source 34a and a circuit comprising a second level detector 31b, a comparator 32b, a switching element 33b and a voltage source 34b are the same as that of a circuit comprising the level detector 12, the comparator 15, the switching element 16 and the voltage source 17 shown in FIG. 2. More specifically, when the stereo broadcasting signal including only either one of the left stereo signal L and the right stereo signal R is received, the switching element 33a or 33b is closed, so that the output signal of the first or second comparator 25 or 29 is applied to the first or second voltage controlled amplifier 22 or 24 as a gain control signal. On the other hand, when a stereo broadcasting signal including both the left stereo signal L and the right stereo signal R at a predetermined level or more, the switching element 33a or 33b is opened, so that a voltage held in the first or second smoothing circuit 26 or 30 immediately before continues to be applied to the first or second voltage controlled amplifier 22 or 24 as a gain control signal.

As described in the foregoing, in the FM stereo demodulator shown in FIGS. 2 and 6, every time the stereo broadcasting signal including only either one of the left stereo signal L and the right stereo signal R is received, separation is automatically adjusted, so that the best separation can be always obtained.

Figure 7:
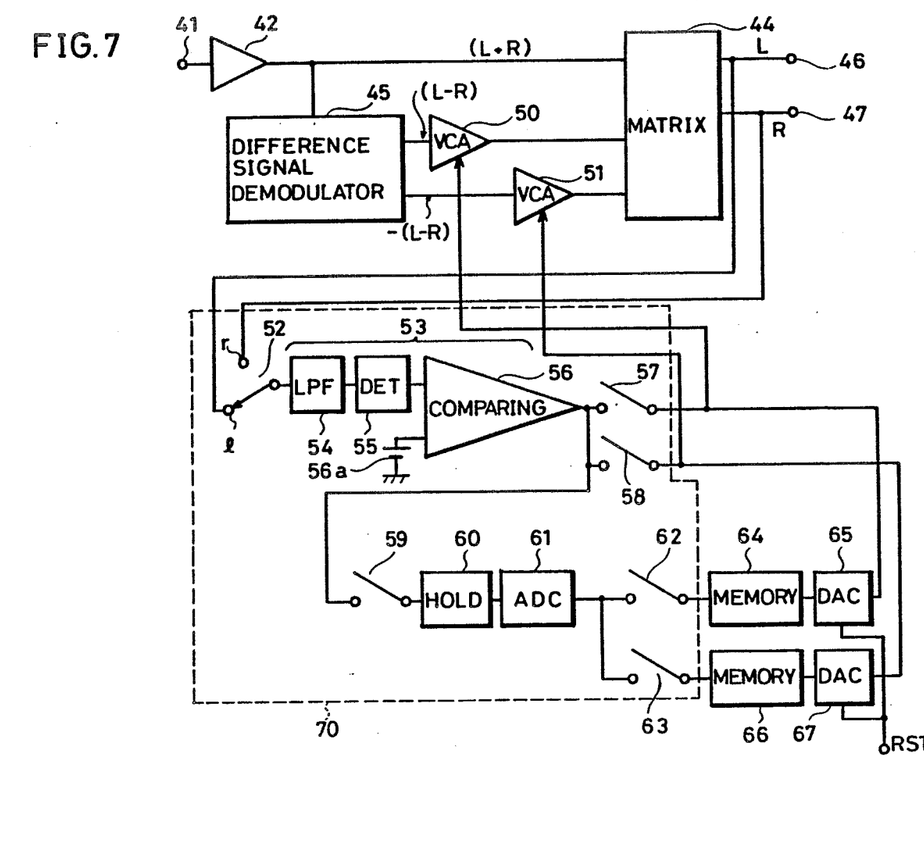
FIG. 7 is a block diagram showing a structure of an FM stereo demodulator according to still another embodiment of the present invention.

FIG. 7 is a block diagram showing a structure of an FM stereo demodulator according to another embodiment of the present invention.

In the FM stereo demodulator shown in FIG. 7, adjustment is made such that stereo separation becomes the maximum in the factory or the like, so that the maximum stereo separation as adjusted is always obtained at the time of reception of the FM stereo broadcasting.

In FIG. 7, a stereo composite signal as FM-detected is applied to an input terminal 41. A stereo sum signal (L+R) in the stereo composite signal is applied to a matrix circuit 44 through a buffer amplifier 42. In addition, a stereo difference signal (L−R) in the stereo composite signal is demodulated in a difference signal demodulator 45, so that a first stereo difference signal (L−R) and a second stereo difference signal -(L−R) whose phases are reverse to each other are outputted. A first voltage controlled amplifier 50 controls a level of the first stereo difference signal (L−R) outputted from the difference signal demodulator 45, to apply the same to the matrix circuit 44. A second voltage controlled amplifier 51 controls a level of the second stereo difference signal -(L−R) outputted from the difference signal demodulator 45, to apply the same to the matrix circuit 44. The matrix circuit 44 generates a left stereo signal L by adding the stereo sum signal (L+R) to the first stereo difference signal (L−R), to output the same from a left output terminal 46. In addition, the matrix circuit 44 generates a right stereo signal R by adding the stereo sum signal (L+R) to the second stereo difference signal -(L−R), to output the same to a right output terminal 47. A first switch 52 selects either one of the left stereo signal L outputted from the left output terminal 46 and the right stereo signal R outputted from the right output terminal 47, to output the same. A separation adjusting circuit 53 comprises a low-pass filter 54, a detector 55 and a comparator 56. The low-pass filter 54 eliminates a high frequency component of the output signal of the first switch 52. The detector 55 detects an output signal of the low-pass filter 54. The comparator 56 compares an output signal of the detector 55 with a reference voltage applied from a voltage source 56a. An output signal of the comparator 56 is applied to the first voltage controlled amplifier 50 through a second switch 57 as a gain control signal. In addition, the output signal of the comparator 56 is applied to the second voltage controlled amplifier 51 through a third switch 58 as a gain control signal. Furthermore, the output signal of the comparator 56 is applied to a holding circuit 60 through a fourth switch 59. Meanwhile, a voltage generated from the voltage source 56a is equal to an output bias voltage of the detector 55.

The holding circuit 60 holds the output signal applied from the comparator 56 through the fourth switch 59. An A-D converter 61 A-D (analog-digital) converts the output signal of the holding circuit 60. A digital signal outputted from the A-D converter 61 is applied to a first memory 64 through a fifth switch 62. The first memory 64 stores the digital signal applied from the A-D converter 61. In addition, the digital signal outputted from the A-D converter 61 is applied to a second memory 66 through a sixth switch 63. The second memory 66 stores the digital signal applied from the A-D converter 61.

A first D-A converter 65 D-A (digital-analog) converts the digital signal stored in the first memory 64, to apply the same to the first voltage controlled amplifier 50 as a gain control signal. A second D-A converter 67 D-A converts the digital signal stored in the second memory 66, to apply the same to the second voltage controlled amplifier 51 as a gain control signal.

An operation of the FM stereo demodulator shown in FIG. 7 will be described.

Description is now made on a case in which stereo separation is adjusted in the factory or the like. First, the first switch 52 is switched to the side of a contact l, the second switch 57 is turned on, and the third to sixth switches 58, 59, 62 and 63 are turned off. In addition, a stereo composite signal including only a component of the right stereo signal R is applied to the input terminal 41. Consequently, the separation adjusting circuit 53 comprising the low-pass filter 54, the detector 55 and the comparator 56 is operated, so that the gain of the first voltage controlled amplifier 50 is adjusted such that leakage of the right stereo signal R applied to the low-pass filter 54 from the left output terminal 46 through the first switch 52 becomes zero. More specifically, a level of the first stereo difference signal (L−R) is adjusted by the first voltage controlled amplifier 50 such that a level of the output signal of the detector 55 is equal to a voltage level of the voltage source 56a.

Thereafter, the fourth and fifth switches 59 and 62 are turned on, and the second switch 57 is turned off. Consequently, the gain control signal outputted from the comparator 56 is applied to the holding circuit 60 through the fourth switch 59, to be A-D converted by the A-D converter 61. The digital signal outputted from the A-D converter 61 is stored in the first memory 64.

Then, the first switch 52 is switched to the side of a contact r, the third switch 58 is turned on, and the other switches 57, 59, 62 and 63 are turned off. Furthermore, the stereo composite signal including only a component of the left stereo signal L is applied to the input terminal 41. Consequently, the separation adjusting circuit 53 is operated, so that a level of the second stereo difference signal -(L−R) is adjusted by the second voltage controlled amplifier 51 such that leakage of the left stereo signal L applied to the low-pass filter 54 from the right output terminal 47 through the first switch 52 becomes zero. Thereafter, the first and sixth switches 59 and 63 are turned on, and the third switch 58 is turned off. Consequently, the gain control signal outputted from the comparator 56 is applied to the holding circuit 60 through the fourth switch 59, to be A-D converted by the A-D converter 61. The digital signal outputted from the A-D converter 61 is stored in the second memory 66.

Thus, the levels of the first stereo difference signal (L−R) and the second stereo difference signal-(L−R) are adjusted such that stereo separation becomes the maximum by suitably switching the first to sixth switches 52, 57, 58, 59, 62 and 63, so that data concerning the gain control signals applied to the first and second voltage controlled amplifiers 50 and 51 at the time of adjustment are stored in the first and second memories 64 and 66.

In an operating period during which the data are stored in the first and second memories 64 and 66, the first and second D-A converters 65 and 67 are kept in a reset state in response to a reset signal RST. When the storing operation is terminated, the reset state of the first and second D-A converters 65 and 67 is released.

Meanwhile, the first and second memories 64 and 66 are structured by a nonvolatile memory, a memory with back-up power supply or the like such that stored data does not disappear even if the power supply of the FM stereo broadcasting receiver is disconnected.

When the operation of adjusting stereo separation by the first to sixth switches 52, 57, 58, 59, 62 and 63 is terminated, the second to sixth switches 57, 58, 59, 62 and 63 are all turned off. Consequently, when FM stereo broadcasting is being received, the first and second voltage controlled amplifiers 50 and 51 are controlled in accordance with the data stored in the first and second memories 64 and 66. More specifically, the data stored in the first and second memories 64 and 66 are D-A converted by the first and second D-A converters 65 and 67, so that analog signals obtained by D-A conversion are applied to the first and second voltage controlled amplifiers 50 and 51 as gain control signals. Thus, the levels of the output signals of the first and second voltage controlled amplifiers 50 and 51 become values determined by adjusting the above described stereo separation, respectively, so that separation between the left and right stereo signals L and R outputted from the left and right output terminals 46 and 47 of the matrix circuit 44 becomes the maximum.

Meanwhile, in recent radio receivers, a microcomputer has been employed in various portions such as a tuning circuit portion and a function switching circuit portion. When the above described stereo separation is adjusted, the first to sixth switches may be switched by a person. In addition, the first to sixth switches may be switched by a microcomputer. In this case, stereo separation is automatically adjusted.

Additionally, if a circuit portion 70 comprising the first to sixth switches 52, 57, 58, 59, 62 and 63, the separation adjusting circuit 53, the holding circuit 60 and the A-D converter 61 is arranged on an adjustment substrate in the factory, the first and second memories 64 and 66 and the first and second D-A converters 65 and 67 are arranged in a radio receiver and the adjusting work of stereo separation is performed in the factory, the number of circuits added to the radio receiver can be decreased, thereby decreasing the cost of the radio receiver.

The adjustment work of stereo separation is not limited to a case in which it is performed in the factory. For example, a service man can adjust separation of an FM stereo demodulator in a radio receiver of a user by using a generator generating only either one of the left stereo signal L and the right stereo signal R and the circuit portion 70.

Additionally, although in the embodiment shown in FIG. 7, the voltage controlled amplifier is provided in a path of the stereo difference signal, the voltage controlled amplifier may be provided in a path of the stereo sum signal.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An FM stereo demodulator for demodulating a left stereo signal and a right stereo signal from a stereo composite signal as frequency-modulation-detected including a stereo sum signal and a stereo difference signal, comprising:
   stereo difference signal demodulating means for demodulating the stereo difference signal in said stereo composite signal,
   matrix means for generating the left stereo signal and the right stereo signal from the stereo sum signal in said stereo composite signal and said stereo difference signal from said stereo difference signal demodulating means,
   first level detecting means for detecting a level of the stereo sum signal in said stereo composite signal,
   second level detecting means for detecting a level of said stereo difference signal from said stereo difference signal demodulating means,
   first comparing means for comparing an output of said first level detecting means with an output of said second level detecting means, and
   first level adjusting means responsive to an output of said first comparing means for changing the level of at least one of said stereo sum signal and said stereo difference signal to be applied to said matrix means, when only either one of said left stereo signal and said right stereo signal is included in said stereo composite signal, such that the output of said first level detecting means is equal to the output of said second level detecting means.

2. The FM stereo demodulator according to claim 1, which further comprises:

third level detecting means for detecting a level of the output of said first comparing means, and first switching means applying the output of said first comparing means to said first level adjusting means when an output of said third level detecting means is smaller than a predetermined value while applying a predetermined voltage to said first level adjusting means when the output of said third level detecting means is larger than said predetermined value.

3. The FM stereo demodulator according to claim 2, which further comprises smoothing means for smoothing the output of said first comparing means, said first switching means comprising second comparing means for comparing the output of said third level detecting means with said predetermined value, and a switching element connected between said first comparing means and said smoothing means and responsive to an output of said second comparing means to be rendered conductive or non-conductive.

4. The FM stereo demodulator according to claim 3, wherein said smoothing means has a short charging time constant and a long discharging time constant 5. The FM stereo demodulator according to claim 2, which further comprises smoothing means for smoothing the output of said first comparing means, said first switching means comprising second comparing means for comparing the output of said third level detecting means with said predetermined value, a voltage source for generating a predetermined voltage, and a switching element responsive to the output of said second comparing means for selectively applying to said first level adjusting means an output of said smoothing means or said predetermined voltage generated by said voltage source.

6. The FM stereo demodulator according to claim 1, which further comprises:

a first low-pass filter for removing a high frequency component of said stereo sum signal to be applied to said first level detecting means, and a second low-pass filter for removing a high frequency component of said stereo difference signal to be applied to said second level detecting means.

7. The FM stereo demodulator according to claim 1, wherein said first level adjusting means comprises a voltage controlled amplifier.

8. The FM stereo demodulator according to claim 1, wherein said stereo composite signal further includes a stereo difference signal as level-compressed, and which further comprises:

compressed stereo difference signal demodulating means for demodulating said stereo difference signal as level-compressed in the stereo composite signal, adding means for adding said stereo difference signal to said compressed stereo difference signal, expanding means for expanding an output of said adding means, fourth level detecting means for detecting a level of a signal outputted from said expanding means, third comparing means for comparing the output of said first level detecting means with an output of said fourth level detecting means, second level adjusting means responsive to an output of said third comparing means for changing the level of the signal outputted from said expanding means, when only either one of said left stereo signal and said right stereo signal is included in said stereo composite signal, such that the output of said first level detecting means is equal to the output of said fourth level detecting means, and second switching means for selectively applying to said matrix means an output of said first level adjusting means or an output of said second level adjusting means.

9. An FM stereo demodulator for demodulating a left stereo signal and a right stereo signal from a stereo composite signal as frequency modulation detected including a stereo sum signal and a stereo difference signal, comprising:

stereo difference signal demodulating means for demodulating the stereo difference signal in said stereo composite signal, matrix means having output terminals for said left stereo signal and said right stereo signal, respectively, for generating the left stereo signal and the right stereo signal from the stereo sum signal in said stereo composite signal and said stereo difference signal from said stereo difference signal demodulating means, level adjusting means for changing a level of at least one of said stereo sum signal and said stereo difference signal to be applied to said matrix means, separation adjusting means for applying a control signal to said level adjusting means at a time of adjustment of stereo separation, such that when a stereo composite signal includes only either one of said left and right stereo signals, a signal level of zero appears at one of said output terminals from which the other of said left and right stereo signals is to be outputted, storing means for storing said control signal generated from said separation adjusting means, and control signal supplying means for applying said control signal stored in said storing means to said level adjusting means at a time of reception of stereophonic broadcasting.

10. The FM stereo demodulator according to claim 9, wherein said storing means comprises:

A-D converting means for analog-digital converting said control signal from said separation adjusting means, memory means for storing an output of said A-D converting means, D-A converting means for digital-analog converting an output of said memory means.

11. The FM stereo demodulator according to claim 9, wherein said separation adjusting means comprises level detecting means for detecting levels of the signals appearing at said output terminals in said matrix means, first switching means selectively connecting to said level detecting means either one of said output terminals of said matrix means, comparing means for comparing an output of said level detecting means with a predetermined voltage, and second switching means for selectively connecting or disconnecting said comparing means and said level adjusting means.

12. The FM stereo demodulator according to claim 11, wherein said storing means comprises
   A-D converting means for analog-digital converting said control signal from said separation adjusting means,
   third switching means for selectively connecting or disconnecting said separation adjusting means and said A-D converting means,
   memory means for storing an output of said A-D converting means,
   fourth switching means for selectively connecting or disconnecting said A-D converting means and said memory means, and
   D-A converting means for digital-analog converting an output of said memory means.

13. The FM stereo demodulator according to claim 12, wherein
   said stereo difference signal demodulating means is responsive to said stereo composite signal for outputting a first stereo difference signal and a second stereo difference signal having reverse polarity to that of the first stereo difference signal,
   said level adjusting means comprises first level adjusting means for changing a level of said first stereo difference signal and second level adjusting means for changing a level of said second stereo difference signal,
   said second switching means comprises a first switch connected between said comparing means and said first level adjusting means and a second switch connected between said comparing means and said second level adjusting means,
   said memory means comprises a first memory for storing the control signal corresponding to said first level adjusting means and a second memory for storing the control signal corresponding to said second level adjusting means, and
   said D-A converting means comprises a first D-A converter corresponding to said first memory and a second D-A converter corresponding to said second memory.

14. The FM stereo demodulator according to claim 11, which further comprises:
   a low-pass filter for removing respective high frequency components of the signals outputted from said output terminals of said matrix means.

15. The FM stereo demodulator according to claim 9, wherein said separation adjusting means comprises
   level detecting means for detecting levels of the signals appearing at the outputs of said matrix means,
   first switching means selectively connecting to said level detecting means either said left stereo signal or said right stereo signal from said matrix means,
   comparing means for comparing an output of said level detecting means with a predetermined voltage, and
   second switching means for selectively connecting or disconnecting said comparing means and said level adjusting means.

16. The FM stereo demodulator according to claim 15, which further comprises:
   a low-pass filter for removing respective high frequency components of the signals outputted from said matrix means.

17. The FM stereo demodulator according to claim 15, wherein said storing means comprises
   A-D converting means for analog-digital converting said control signal from said separation adjusting means,
   third switching means for selectively connecting or disconnecting said separation adjusting means and said A-D converting means,
   memory means for storing an output of said A-D converting means,
   fourth switching means for selecting connecting or disconnecting said A-D converting means and said memory means, and
   D-A converting means for digital-analog converting an output of said memory means.

18. The FM stereo demodulator according to claim 17, wherein
   said stereo difference signal demodulating means is responsive to said stereo composite signal for outputting a first stereo difference signal and a second stereo difference signal having reverse polarity to that of the first stereo difference signal,
   said level adjusting means comprises first level adjusting means for changing a level of said first stereo difference signal and second level adjusting means for changing a level of said second stereo difference signal,
   said second switching means comprises a first switch connected between said comparing means and said first level adjusting means and a second switch connected between said comparing means and said second level adjusting means,
   said memory means comprises a first memory for storing the control signal corresponding to said first level adjusting means and a second memory for storing the control signal corresponding to said second level adjusting means, and
   said D-A converting means comprises a first D-A converter corresponding to said first memory and a second D-A converter corresponding to said second memory.

19. An FM stereo demodulator for demodulating a left stereo signal and a right stereo signal from a stereo composite signal a frequency modulation detected including a stereo sum signal and a stereo difference signal, comprising:
   stereo difference signal demodulating means for demodulating the stereo difference signal in said stereo composite signal,
   matrix means having output terminals for said left stereo signal and said right stereo signal, respectively, and for generating the left stereo signal and the right stereo signal from the stereo sum signal in said stereo composite signal and said stereo difference signal from said stereo difference signal demodulating means,
   level adjusting means for changing a level of at least one of said stereo sum signal and said stereo difference signal to be applied to said matrix means,
   separation adjusting means for applying a control signal to said level adjusting means at a time of adjustment of stereo separation, such that when the stereo composite signal includes only either one of said left and right stereo signals, a signal level of zero appears at one of said output terminals from which the other of said left and right stereo signals is to be outputted, storing means for storing said control signal which is generated from said separation adjusting means, control signal supplying means for applying said control signal stored in said storing means to said level adjusting means at the time of reception of stereophonic broadcasting, and switching means for inhibiting said control signal which is generated from said separation adjusting means from being applied to said storing means anytime except at the time of adjustment of stereo separation.

* * * * *